ically Augmentab
United States Patent [19]
Lomet

[11] Patent Number: 4,611,272
[45] Date of Patent: Sep. 9, 1986

[54] KEY-ACCESSED FILE ORGANIZATION

[75] Inventor: David B. Lomet, Yorktown Heights, N.Y.

[73] Assignee: International Business Machines Corporation, Armonk, N.Y.

[21] Appl. No.: 463,469

[22] Filed: Feb. 3, 1983

[51] Int. Cl.$^4$ ............................................. G06F 12/02
[52] U.S. Cl. ..................................... 364/200; 364/300
[58] Field of Search ... 364/200 MS File, 900 MS File, 364/300; 360/49

[56] References Cited

U.S. PATENT DOCUMENTS

| | | | |
|---|---|---|---|
| 3,681,781 | 8/1972 | Batcher | 444/1 |
| 4,096,567 | 6/1978 | Millard et al. | 364/200 |
| 4,240,143 | 12/1980 | Besemer et al. | 364/200 |
| 4,257,097 | 3/1981 | Moran | 364/200 |
| 4,290,105 | 9/1981 | Cichelli et al. | 364/200 |
| 4,295,124 | 10/1981 | Roybal | 364/900 |
| 4,325,120 | 4/1982 | Colley | 364/200 |
| 4,468,728 | 8/1984 | Wang | 364/200 |

OTHER PUBLICATIONS

D. Comer, "The Ubiquitous B-Tree", Computing Surveys, vol. 11, No. 2, Jun. 1979.
R. Fagin et al., "Extendible Hashing–A Fast Access Method for Dynamic Files", ACM Trans. Database Syst., vol. 4, No. 3, Sep. 1979, pp. 315–344.
W. Litwin, "Linear Hashing: A New Tool for File and Table Addressing", Proc. 6th Int'l. Conf. on Very Large Databases, Montreal, 1980, pp. 212–223.
G. Martin, "Spiral Storage: Incrementally Augmentable Hash Addressed Storage", Theory of Computation, Report No. 27, U. of Warwick, Coventry, England, Mar. 1979.
J. L. Carter et al., "Universal Classes of Hash Functions", J. Computers and System Sciences, vol. 18, No. 2, Apr. 1979, pp. 143–144.

Primary Examiner—James D. Thomas
Assistant Examiner—Florin Munteanu
Attorney, Agent, or Firm—Roy R. Schlemmer

[57] ABSTRACT

A key-accessed (indexed) file is organized such that the file structure consists only of two levels, an index level and a data level. Both levels are permanently stored on a page-organized secondary storage medium that supports random accessing of the pages. The index level is designed to have a fixed and specifiable number of pages and is stored entirely in the computer's memory when the file is in use. The fixed size of the index is made possible by having each index entry reference a data node with a growing (or shrinking) number of data pages as the file changes in size. Avoiding the accessing of more than one of the data pages referenced by an index entry is accomplished by means of an address computation that utilizes bits of the search argument.

12 Claims, 4 Drawing Figures

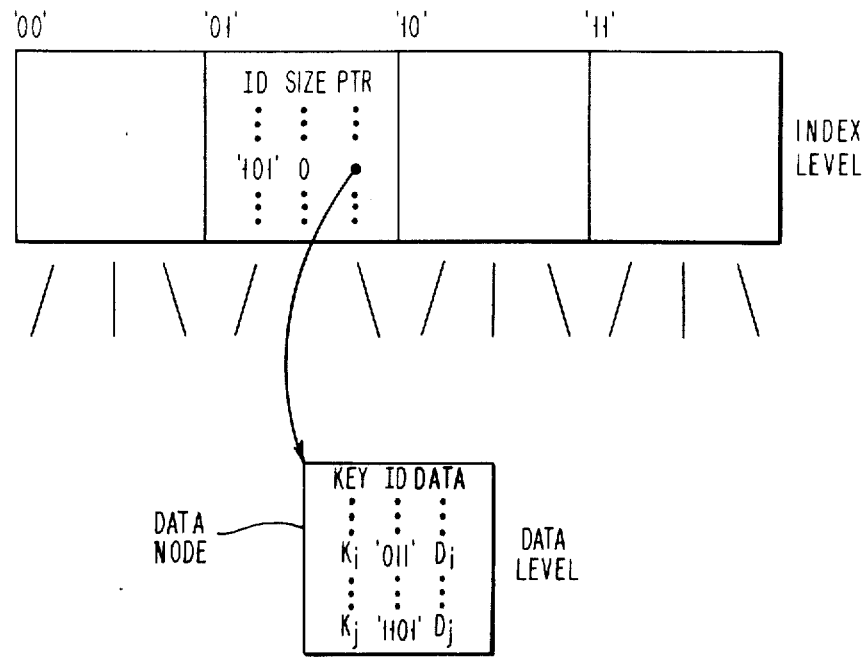
FIG. 2.1
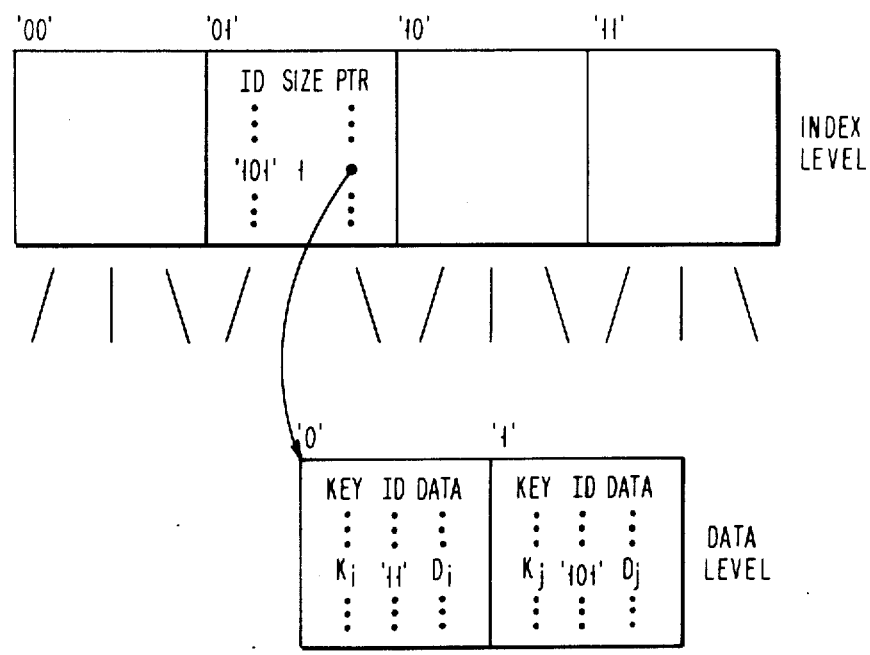
FIG. 2.2

KEY-ACCESSED FILE ORGANIZATION

BACKGROUND OF THE INVENTION

1. Field of the Invention

The present invention relates to file organizations for computer systems. More particularly, it relates to the accessing of data in secondary storage systems, such as disks, in a minimum number of access attempts.

2. Description of the Prior Art

The secondary storage devices in large computer systems provide for the storing, updating and retrieving of data to and from large collections of data in the main memory of the computer. The organization of such data, termed files, is obviously important to make accessing efficient. In addition, it is important to be able to insert (and delete) new data elements into and from the files particularly on random access secondary storage devices, such as disks. Such files are termed "dynamic" files.

As is well known to skilled computer designers and system programmers, many techniques for structuring such files have been proposed, with the B-Tree index structure being the present standard for commercial equipment. The article by D. Comer, "The Ubiquitous B-Tree", Computing Surveys, Vol. 11, No. 2, June 1979, pages 1-137 contains a good review of B-Trees.

Another, more recent type of file organization scheme suitable for dynamic files is extendible (also known as expandable or dynamic) hashing. A number of techniques have been developed that permit extendible hashing to be used as a fast method to access large files residing on external storage for files of fixed size as well as for files which increase in size. For example, the article by R. Fagin et al entitled, "Extendible Hashing—A Fast Access Method for Dynamic Files", ACM Trans. Data Base Syst. Vol. 4, No. 3, September, 1979, pp. 315-344, describes the access technique of extendible hashing which, unlike conventional hashing, has a structure which grows and shrinks as the file does. The Fagin et al method separates the hash address space from the address space of the data by employing an index between the hash function and the disk address where data is stored; and it generates more bits than are required initially to identify the index term. However, Fagin et al. require close to two disk accesses per data access once the file is sufficiently large that only a small portion of the index fits in the main memory.

Litwin in his article entitled, "Linear Virtual Hashing: A New Tool for Files and Tables Implementation", published in Proc. 6th Int'l. Conf. on Very Large Data Bases, Montreal, 1980, pages 212 to 223, describes a dynamic hashing function, called a linear hashing function, in which the hash addresses of the keys are changed in some predefined order instead of changing the hash address for the data whose page has overflowed. This has the advantage of causing the space allocated for the file to grow linearly by the addition of contiguous pages to the end of the current file. However, Litwin assumes the existence of a contiguous, continuous address space, which is not an effective way to utilize the space efficiently. While he describes a method of mapping his page numbers to disk addresses, his method of utilizing the disk space has the result that the cost, in disk accesses, to add an additional primary page to his file typically requires three accesses per page. Further, the number of overflow pages used and the performance are not as favorable as those of my invention.

The paper by G. Martin, entitled, "Spiral Storage; Incrementally Augmentable Hash Addressed Storage", Theory of Computation, Report No. 27, U. of Warwick, Coventry, England, March 1979, describes a hashing technique in which the keys are mapped into the address space so that they tend to be more dense at one portion of the space than at another. During file growth, keys which used to occupy the more dense space are spread over the new, less dense space. Martin uses a hash function mapping the keys onto the space exponentially rather than uniformly. However, Martin's method of mapping the relative pages generated by his hash function into real disk addresses is complicated and expensive in disk accesses per primary page added. Further, his method of handling overflow records involves rehashing, which can result in adverse performance, particularly on unsuccessful searches.

These extendible hashing techniques do not require a complete file reorganization and rehashing to cope with file growth or shrinkage. In addition, they provide faster random access than is typically provided by tree index methods, such as B-trees. They also provide for a limited form of sequentiality, i.e., the ability to sequence through the records of the file in some order, though not in key order. However, none of these hashing methods alone provides for a combination of advantages which is desired in file addressing, i.e., a single disk access, straightforward storage management of the underlying disk space and avoiding the necessity for rehashing to cope with collisions.

A characteristic of all extendible hashing schemes, with the exception of the spiral storage described in the above-referenced paper by Martin, has been oscillatory performance. The hash function distributes the hashed keys uniformly over the pages of the file. Thus, these pages fill up uniformly and become completely filled almost simultaneously. Within a small period of further file growth, the large majority of file pages all overflow and their entries must be split over two pages. The result is that utilization swings between 50% and almost 100%, suddenly "crashing" to 50% during the short splitting period. In addition, the cost of doing an insertion is comparatively low at low utilizations but is considerably higher during the splitting period because so many insertions lead to page splitting. Finally, if overflow records are required by the technique, as they usually are, then the frequency of occurrence of overflow increases dramatically as utilization approaches 100%. This results in a sharp increase in the cost (in terms of disk accesses) of insertions and searches as accessing of the overflow records becomes increasingly common.

SUMMARY OF THE INVENTION

It is therefore an object of my invention to retrieve data from a chosen (arbitrary) key almost always with a single access.

It is a further object of my invention to enable a change in the size of a file without major reorganization or rehashing.

It is another object of my invention to manage the physical disk space as part of the method itself in such a way that storage space is utilized efficiently, by means of straight-forward techniques.

It is yet another object of my invention to provide a method of access in which the cost of the search and the insertion of keys do not vary as the file grows (or shrinks).

My invention is the organizing of a key accessed (indexed) file such that the file structure consists only of two levels, an index level and a data level. Both levels are permanently stored in a page-organized secondary storage medium that supports random accessing of the pages. The index level is designed to have a fixed and specifiable number of pages and is stored entirely in the computer's memory when the file is in use. The fixed size of the index is made possible by having each index entry reference a data node with a growing (or shrinking) number of data pages as the file changes in size. Avoiding the accessing of more than one of the data pages referenced by an index entry is accomplished by means of an address computation that utilizes bits of the search argument The number of bits involved in this computation is given by:

log$_2$ (number of pages referenced by the index term)

where the number of such pages is an integral power of two.

A maximum buffer size is selected which represents the number of pages of main memory which will be committed to the file (and access) method to aid in accessing the data. This buffer contains an index to the file, as in extendible hashing, but the index is limited so as to be contained within the buffer size. The existence of an index level makes storage management easier. Once the index has grown to its limit further file growth is accomplished by means of doubling the number of pages in a data node so that the number of pages referenced by an index entry is likewise doubled.

Overflow pages are used, when required, to make sure that storage utilization remains adequately high. A novel technique for overflow pages assures that unsuccessful searches rarely require more than two disk accesses while achieving high space utilization for the overflow pages.

The method includes choosing a hashing function, h(key), which distributes the keys of the file uniformly. The result of this function is then exponentially distributed using another function, exhash(key), such that there are twice as many key entries near one boundary of the key space than at the other boundary.

I call this novel and improved form of extendible hashing by the name of bounded index exponential hashing, termed "BEH" hashing. It has important advantages over most of the other extendible hashing technique in that it provides both random access to any record of a file in close to one disk access as well as performance which does not vary with file size. It is straightforward to implement and requires only a fixed and specifiable amount of main storage to achieve this performance. Its underlying physical disk storage is readily managed, and record overflow is handled so as to insure that unsuccessful searches rarely take more than two accesses.

BRIEF DESCRIPTION OF THE DRAWING

FIGS. 2.1 and 2.2 are block diagrams illustrating the structure of a file according to my invention, before and after data node doubling, respectively.

DESCRIPTION OF THE PREFERRED EMBODIMENT

Figure 1:
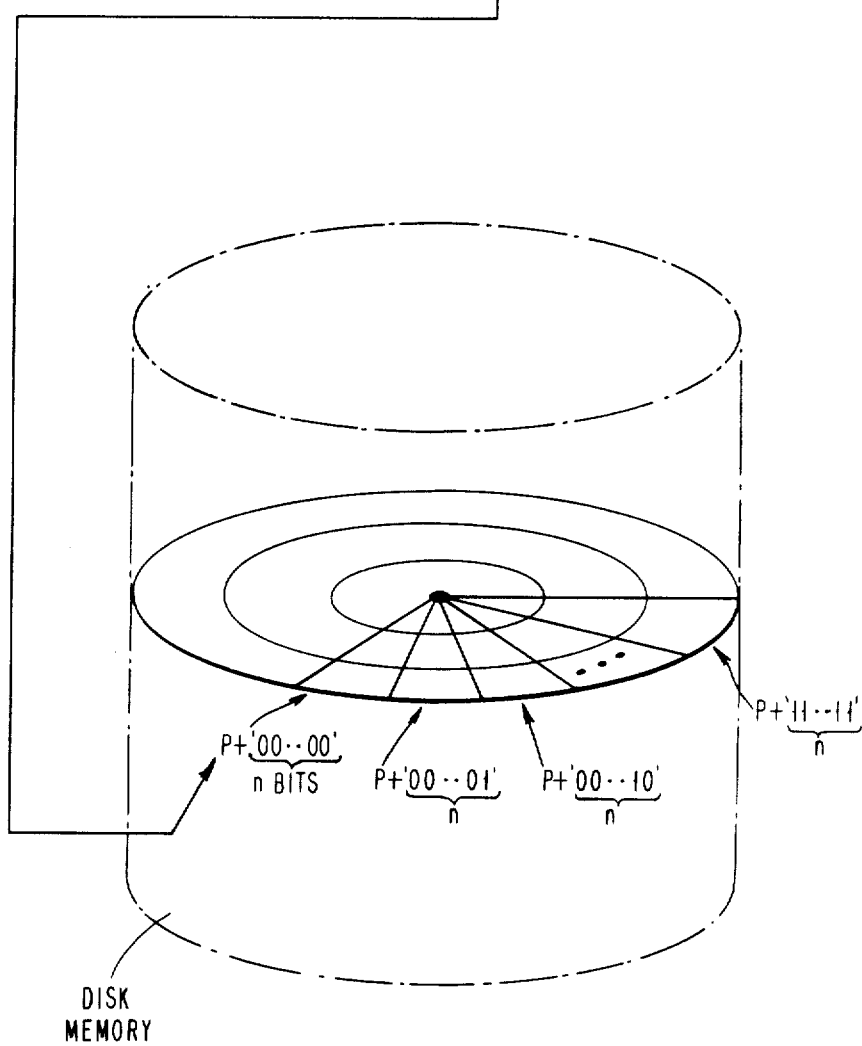
FIG. 1 is a schematic diagram illustrating the placement of the index level in main memory and the data node level in secondary memory.

In describing my invention, I use the following terminology which has become standard in this field. A file is a collection of records, each one identified by a key. An access method includes a logical storage structure into which a file can be mapped, and the algorithms needed to manage this structure. The method manages a collection of storage units, called pages, usually of fixed size, of a secondary storage device or devices. To specify an access method, the relationship between the pages as well as the internal structure of a page and algorithms for file updating (inserting, deleting or changing records) and retrieval must be described. By the term "access" I mean any of the operations of updating or retrieving. Pages are accessed by following an access path which leads from page to page. In general, a page contains records and index entries containing pointers to other pages. If a page contains only index entries, it is called a directory (or index) page. If a page contains only keys, and their associated records, then it is called a data page, or leaf.

I. OVERVIEW

According to my invention, a hashing function h(key) is chosen that distributes the keys of the file as uniformly as possible. A hashing function chosen from a class of universal hashing functions as described in the paper by J. L. Carter et al entitled, "Universal Classes of Hash Functions", J. Computers and System Science, Vol. 18, No. 2, (April, 1979), pp. 143–144, provides a very high probability that the hashed keys will be distributed uniformly. For example, the following hashing function is suitable:

$$h(key) = (((m * key) + n) \bmod p) \bmod b \quad (1)$$

when p is a prime number, b is the size of the hash space, and m and n are integers.

The hash address space (i.e., the range of h) must be such as to accommodate the entire planned growth of the file; hence in practice it produces hash addresses of 24 bits or more. These are interpreted as 24-bit (or more) fractions between zero and one.

The result of the hash function (1) is then exponentially distributed, using the function:

$$exhash(key) = 2^{h(key)} - 1 \quad (2)$$

where h(key) is the result of applying the universal hash function. The purpose of equation (2) is to assure uniform performance, instead of oscillatory performance, as the file grows. After this step, the exponential nature of the hash function does not enter into the access method further. Performance is influenced but not the algorithms.

The function exhash(key) remaps a uniform distribution of hashed keys in the range from zero to one into values that also range from zero to one but are such that hashed key frequency varies over this range. Hashed keys near zero are, using the exponential hash, twice as frequent as hashed keys near one. Disk access behavior can be made constant because the relative frequency of pages with any given utilization can be made constant, thus removing oscillations in overflows and in splitting frequency.

I use exponential hashing without altering the important characteristics of other extendible hashing techniques. Thus, the exponential hashed key value can be stored with data and index entries and can be used to assist in searching within pages of the file. More importantly, when pages overflow, the bits of the stored hashed key determine how to split the entries on the overflowing page over two pages.

The splitting is the same kind of digital splitting required for most extendible hashing methods. It consists of the following. Let kp be the prefix of all hashed key values (i.e., the results of exhash(key)) that are stored on a given page. When the page is full and yet another key is to be inserted, the contents of the page are split (divided) between two pages as follows. The page contents (index or data) that are associated with hashed keys prefixed by kp⊃'0' are placed in one of the pages while the contents that are associated with hashed keys prefixed by kp⊃'1' are placed on the other page.

FIG. 1 illustrates the physical placement of the BEH index in computer main memory and data nodes placed on secondary storage devices as contiguous blocks of pages, with the number of pages being an integral power of two.

FIG. 2.1 illustrates the state of the BEH organized file prior to data node doubling. At this stage, a copy of the index level resides in the buffer of the main (primary) computer memory; the data level resides in the secondary memory, such as a disk. For simplicity of presentation, an index size, in pages, of four is assumed.

I. A. File Search

In my preferred embodiment, the file is searched as follows. The first bits of exhash(ARG), where ARG is the search key whose data is desired, are used to select the index page where the search for ARG's data continues. In the file shown in the figures, the first two bits of exhash(ARG) are used and the '01' index page is selected. Additional bits of exhash(ARG), e.g., bits 2 through 5, are used to find the disk address, "PTR", in index page '01' which refers to the page on which data for ARG will reside, if the search is to be successful. The page referenced by PTR is read and is searched to determine whether "ARG" is present or not, and if so to return its associated data. The node (page) at the data level in FIG. 2.1 contains data for values of exhash(ARG) begingning with '10'⊃'101'. $D_i$ in the data level page is the data for ARG=$K_i$ with exhash(ARG)='01'⊃'101'⊃'011'='01101011'. A complete description of searching the file, before and after data node doubling is given in the FILE OPERATIONS section of the specification.

I. B. Growth after the Buffer is Filled

Assume that a data node (page) overflows and that the index page which references it is itself filled. In the standard extendible hashing method, this would trigger the splitting of the data page, causing the index page to overflow. Index page overflow would be handled by doubling the index size, thereby separating the entries on each page of the index into two pages, based on the first bit of ID, which is the unused suffix of the stored result of applying exhash to the incoming insertion arguments. Thus, the index would increase to eight pages and require three bits of exhash(ARG) to access it.

In my method of BEH hashing, index size does not increase. Rather, the data node doubles in size so as to accommodate the overflow, instead of the node splitting into two nodes. Thus, multi-page data nodes arise as the file grows in size. Subsequent page overflow may lead to subsequent additional data node doubling. The doubling, just as the splitting did, divides the entries between pages based on the value of the next bit of the stored hashed key values. This requires that: (a) entries in the index level refer to a data node whose size is also indicated; and (b) the search procedure make use of this size and the appropriate bits of exhash(ARG) in order to select the page of the data node on which the data associated with ARG resides.

Because of (b), having this size be $\log_2$ (node size in pages) is useful, as this is the number of bits of exhash(ARG) to be used in making this selection. FIG. 2.2 illustrates the BEH file of FIG. 2.1 after the node containing exhash(ARG) has doubled.

Node doubling, regardless of the original size of the node, has the effect of splitting the contents of each page of the node between two pages of the doubled node. In the example of FIG. 2, the node goes from one page to two pages. This splitting of page contents over two pages of the new doubled node is performed based on the appropriate binary digit of the hashed key value, exactly as splitting in most extendible hashing methods is performed. Thus, if kp is the prefix of all hashed key values of a page of the original node, then the two contiguous pages of the doubled node that will contain these values are such that kp⊃'0' is the prefix of all hashed key values of one of the pages and kp⊃'1' is the prefix of all hashed key values of the other page. In the example of FIG. 2, kp='01'⊃'101' for the data node illustrated in FIG. 2.1. This value continues as the hashed key prefix for the data node of FIG. 2.2 but not for each page of the node. Rather, the hashed key prefix for the first (zeroth) page is '01'⊃'101'⊃'0' while the hashed key prefix for the second (oneth) page is '01'⊃'101'⊃'1'.

At the time of doubling, all information associated with the original page is split between the two new pages in the above manner. This includes not only the immediate contents of the original page, but also any overflow information that would have been contained in the original page had there been sufficient space. Thus, doubling of a node typically permits such overflow information to be absorbed into the two new pages, thus eliminating the overflow pages after doubling.

I. C. Initial Growth of the File

The initial growth of the file may be done by using the index doubling scheme of extendible hashing so long as the index, in pages, can be contained within the buffer. All subsequent file growth is then handled using data node doubling. Thus, one begins with a one page index and inserts "records" until that index page can no longer hold all the required index entries pointing to data pages. At this point the index doubles, all entries beginning with a '0' bit being indexed via page 0 of the index, all those beginning with a '1' bit being indexed via page 1. Subsequently, when one of those index pages overflows, the index will be doubled again, as with extendible hashing. This doubling stops when the index size, in pages, equals the maximum permitted by the buffer size. Data node doubling is then used for further file growth.

II. FILE OPERATIONS

II. A. Search

The search method, i.e., how to find data associated with a given key, is illustrated by the SEARCH program in Table I. The program is explained as follows. The key is supplied to SEARCH as the value of ARG. The address in main memory of the data associated with the key is returned by SEARCH in D_ADR if ARG is found. If ARG is found, then the variable FOUND is set to true when SEARCH returns, otherwise it is set to false. The SEARCH is then initiated by:

CALL SEARCH(ARG,D_ADR,FOUND)

The following is a description of how this SEARCH procedure accomplishes its purpose.

(1) Convert the search argument ARG to its hashed value, using EXHASH; call the result HK.

HK:=EXHASH(ARG)

(2) Let P be the starting secondary storage address of the index pages and I_SIZE be the logarithm base two of the size, in pages, of the index.

(3) Compute the index page Q on which to find the index term that will lead to the data for ARG; it is found by taking the first I_SIZE bits of HK and adding them to P, i.e.

Q:=P+SUBSTR(HK,0,I_SIZE)*

(4) Convert the disk address Q into a memory address by locating the starting address of the page in main memory, i.e.,

I_ADDR=LOCATE(Q)

(This is possible without reading data from secondary storage because the index pages of the file are already in main memory.)

(5) Find the index entry for HK in the page pointed to by I_ADDR. Since the index entry need not contain the part of HK used to find the index page, we need to provide only

HK_REST=SUBSTR(HK,I_SIZE,*)

which removes from HK the first I_SIZE bits. What is returned as a result of finding an index entry for HK_REST are three quantities:
  (i) LEN which is the number of bits of HK_REST that are consumed in identifying the index entry;
  (ii) SIZE which is the logarithm, base two, of the number of pages in the data node referenced by the index entry; and
  (iii) PTR which is the disk address of the first (zeroth) page of the data node referenced by the index entry.
Thus we,

CALL IFIND(HK_REST, I_ADDR, LEN, SIZE,PTR)

(6) Compute, using the next SIZE bits of HK_REST after those used in identifying the index entry, i.e., LEN bits, the disk address of the data page where data for ARG is to be found, i.e.,

PAGE_DISP=SUBSTR(HK REST,LEN,SIZE)

and

DATA_PAGE=PTR+PAGE DISP (7) Read the data page specified in DATA_PAGE from secondary storage into memory and report its memory address in DATA_ADDR., i.e.,

CALL READ(DATA_PAGE, DATA_ADDR)

Note: This call to READ is the only place, except for the case when data page overflow occurs, where reading secondary storage is required.

(8) Find ARG on the data page read into memory. If ARG is found, then FOUND is set to true, if not found, then false. If an overflow page exists for the node then OVERFLOW is set to true; if not, then false. If OVERFLOW is true then O_PAGE will be set to the disk address of the overflow page. If ARG is found, the address of its data is returned in D_ADR. Thus,

CALL DFIND(ARG,D_ADR,FOUND, OVERFLOW,O_PAGE)

(9) If ARG's data has been found, then return, as a result of the SEARCH procedure, D_ADR, and FOUND set to true, i.e.,

IF FOUND THEN RETURN.

(10) If ARG's data has not been found and no overflow page exists, then ARG's data does not exist in the file. RETURN FOUND set to false as a result of the SEARCH procedure, i.e.,

IF NOT (OVERFLOW) THEN RETURN

(11) If ARG has not been found but an overflow page exists on which might be located the data for ARG, then search the overflow page (or pages) for ARG's data.

Since the overflow page is identified within the node by PAGE_DISP, we must supply PAGE_DISP as well as ARG and O_PAGE. The result we expect is an appropriate setting for the quantities D_ADR and FOUND.

Thus,

CALL OFIND(ARG,O_PAGE,PAGE DISP, D_ADR,FOUND).

(Note that OFIND is not normally called because overflow is unusual. Further, if it is called, it usually involves only a single read of a page from secondary storage.)

*SUBSTR is a function procedure that takes a string argument, e.g., HK, a starting position in the string, e.g., 0, and a length for the substring, e.g., I_SIZE, and returns the string which consists of locations "start" through "start+length −1" of the string argument. If an * is given as the length, the substring specified includes the remainder of the argument string.

TABLE I

SEARCH:PROCEDURE(ARG,D_ADR,FOUND)

DCL
P: START SECONDARY STORAGE ADDRESS OF THE INDEX PAGES
I-SIZE: LOGARITHM BASE TWO OF THE NUMBER OF

TABLE I-continued

```
SEARCH:PROCEDURE(ARG,D_ADR,FOUND)
INDEX PAGES
HK: = EXHASH(ARG);
Q: = P+SUBSTR(HK,0,I_SIZE);
I_ADDR: = LOCATE(Q);
HK_REST: = SUBSTR(HK,I_SIZE,*);
CALL IFIND(HK_REST,I_ADDR,LEN,SIZE,PTR):
PAGE_DISP = SUBSTR(HK_REST,LEN,SIZE);
DATA_PAGE = PTR+PAGE_DISP:
CALL READ(DATA_PAGE, DATA_ADDR);
CALL DFIND(ARG,D_ADR,FOUND,
OVERFLOW,O_PAGE)
IF FOUND | NOT (OVERFLOW)THEN RETURN;
Note: This simply combines the cases described in
the text. Only if ARG is not FOUND and OVERFLOW
pages exist do we perform the following statements.
CALL OFIND(ARG,OPAGE,PAGE_DISP,
D_ADR,FOUND);
RETURN:
END SEARCH.
```

II. B. Updating

Insertion and deletion both proceed by first searching for the designated entry and locating the page on which it resides or is to reside. Most of the time these update operations will then merely change that page in the expected way, i.e., for insertion, including a new record with a key value that did not exist previously; and for deletion, removing the record whose key matches the key value specified.

In these cases, both operations require only a single read, when overflow records are absent, followed by a single write of the updated page back onto the disk. The existence of overflow records requires a second read prior to the write. If insertion requires a page to "split", then the size of the data node is doubled, thus spreading the entries of each of its pages over two pages. Such multipage doubling can be done quite efficiently by reading and writing multiple pages during each I/O operation, because the pages are contiguous.

II. C. Sequential Read (Hashed Key Order)

Hashing cannot support key ordered sequential search. There are times, however, when sequential access is desirable and key order is not important. For this case, BEH hashing has the very desirable property of page contiguity within a node. This permits reading blocks of pages with a single I/O read and buffering the results. Disk arm movement is of course greatly reduced under these conditions.

III. HANDLING OVERFLOW

I provide a concrete method for handing overflows so to assure that file utilization is maintained at a reasonable level by an appropriate choice of the number of pages devoted to accommodating overflow entries. This assures good and constant performance for the file.

III A. Overflow for Consecutive Pages

One overflow page is associated with every $2^n$ contiguous pages of a data node. The number 'n' is not fixed but changes as the utilization of a node increases. For a good compromise between utilization and disk access performance, it is not necessary to have more than one overflow page for every four data pages except for very small page sizes. Thus, an overflow page contains entries that share a common prefix 'X' such that 'X' concatenated with a bit string of length 'n' produces the common prefix 'kp' of one of its associated primary pages.

The fact that an overflow page is associated with consecutive primary pages has important implications with respect to node doubling and sequential search, for the same basic reason. In both these cases, it is possible to perform multipage I/O operations because many pages will have to be accessed in any event. Thus, the number of separate I/O operations can be reduced by a large factor. For savings to be realized, however, it is necessary to avoid many separate I/O operations in accessing the associated overflow entries of these pages. This organization requires one additional I/O operation to access the overflow entries for $2^n$ consecutive pages. This permits the saving in I/O operations for the primary pages to become a real saving even after overflow pages are included.

III. B. The "Tree" of Overflow Pages

When a page of a node first overflows, it must reference a designated page in that node, perhaps the first page (page zero) to obtain a reference to the initial overflow page, if one exists. If no such overflow page exists, one is allocated and a pointer to it stored in both page zero, for the sake of the currently non-overflowing pages, and in the overflowing page. This initial overflow page will serve as the root of a "tree" of overflow pages which is grown as the number of overflow entries increases, such that more and more overflow pages are required.

Figure 3:
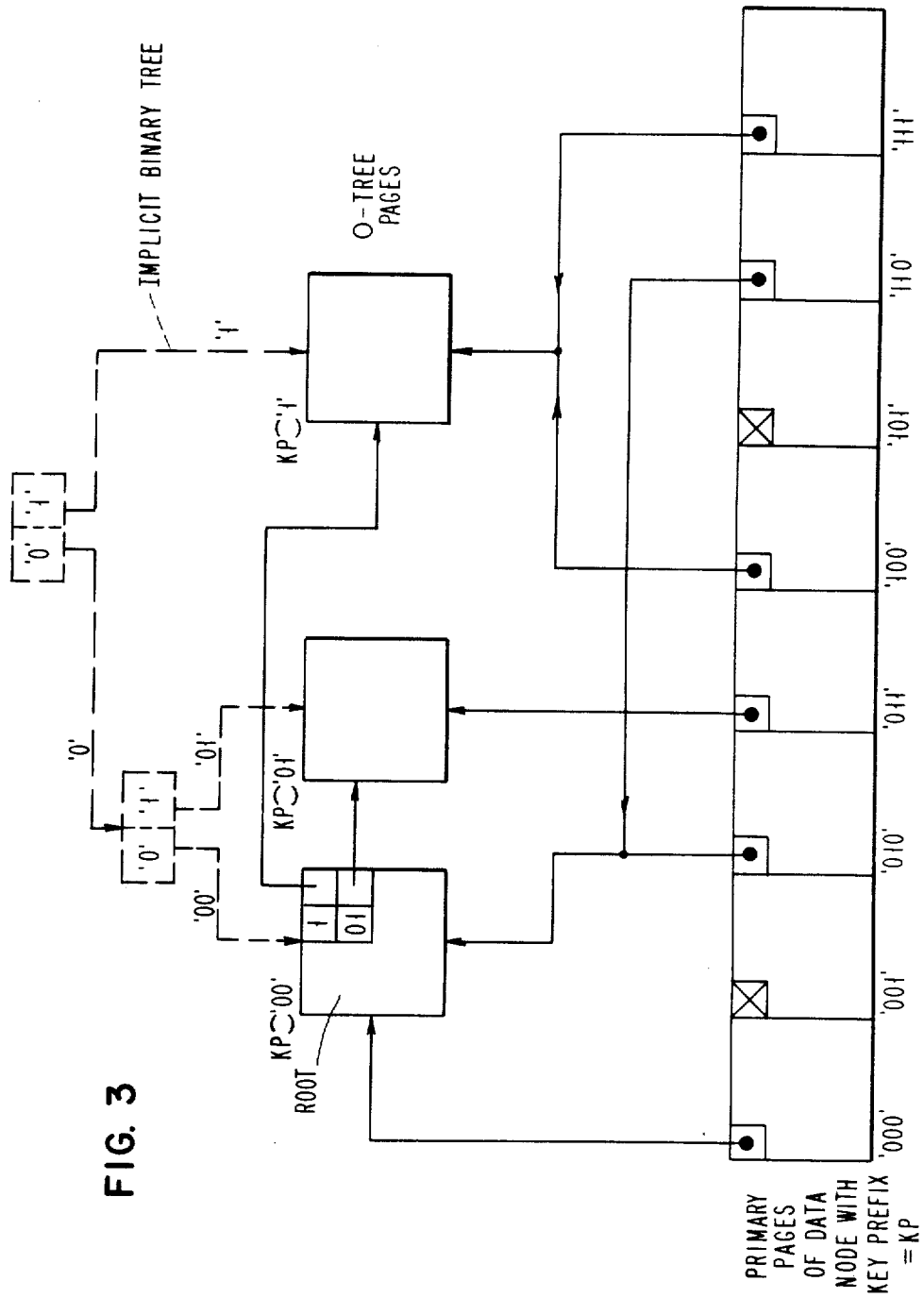
FIG. 3 is a block diagram illustrating the structure of a data node together with its associated tree (O-Tree) of overflow pages.

Whenever an overflow page itself overflows, the entries on the page are split between two pages, the current page and a newly allocated one, based on the bits of the key. That is, the overflow page is split digitally, exactly as the entries in the primary pages are. Each of the two pages then serves as the overflow page for one half of the primary pages served by the original overflow page A pointer to the new overflow page is stored in the original overflow page and, when appropriate, in the primary page whose insertion triggered the split. (Note that the other primary pages that share the new overflow page do not have their overflow page pointers immediately updated. Rather, this is done during the next access to the primary page that requires an access to the overflow page as well.) FIG. 3 is a diagram of how this process works. As is indicated in FIG. 3, this growth process can continue until a "tree" of pages, called an O-tree, exists.

Note that if all overflow entries are from one half of the primary pages using the overflow page, then the splitting process described above that uses the next bit of the stored hashed key would fail to accommodate the overflow entries. All would still be assigned to one page. In this case, one must find the first bit that succeeds in splitting the overflow entries and use this for dividing them, constructing an index in the original page that reflects the actual splitting performed.

It is possible for the O-tree to grow sufficiently so that one primary page ends up having more than one overflow page, particularly if the page size is small. This growth can proceed in exactly the same fashion with respect to O-tree structure. However, the primary page itself should point directly to all pages containing its overflow entries. Thus, the primary page will need to contain a small "index" to each of its overflow pages, rather than simply the one pointer. This index should indicate not just the overflow page addresses, but also the key space of entries in each such page. This information will continue to enable the disk access cost of a search to be limited to no more than two accesses.

As is readily observed, each node of an O-tree which serves as the ancestor of other nodes also serves as a leaf node, so the O-tree structure has missing links. In particular, as I have constructed the O-tree in FIG. 3, all links to leftmost pages of the tree have been eliminated. This saves both space and search time.

III. C. Searching the O-tree

When a primary page is full, each successive insertion will result in an entry being placed in an overflow page. The overflow page is found as follows. The pointer to the overflow page points either to the first page of the node or to an actual overflow page. If that page is the first page of the node, a pointer in this page refers to the root of the O-tree. Following the pointer leads to the root of the O-tree and the situation becomes the same as if the overflow pointer in the primary page had pointed at an overflow page initially. If the prefix associated with the overflow page is a prefix of the entry, then the page is the correct overflow page for the primary page and the entry can be inserted into this page (or found in this page if the operation is a search). If this is not the case, the index in the page must be accessed to find the pointer to the next node in the O-tree where the overflow page for the entry might be located. Note that indirections are followed only when '1' bits are encountered in the argument key. Thus, the number of links traversed is, on average, half the height of the implicit binary tree represented by the O-tree.

Whenever a primary page discovers that its overflow page has moved, during either a search or an insertion, it updates its overflow page pointer to refer to the new overflow page. (The overflow page "moves" as the O-tree grows and overflow pages split.) Thus, occasionally extra accesses to additional overflow pages occur.

The penalty in extra accesses can be reduced. It is possible to eliminate the initial reference to the first page of the node by allocating an initial overflow page (or pages) when a node is doubled. The primary pages can then be initialized so as to point directly to the "root" of the O-tree. Further, the height of O-trees can be clipped so as to never exceed a selected number, e.g., six. This can be accomplished by allocating an overflow page for every 64 pages of the node instead of only one per node.

IV. WHEN TO DOUBLE A NODE

Because the O-tree is a dynamic structure which can grow to accommodate more and more overflow entries, there is no fixed point at which a node must double because an entry cannot be inserted. Thus it becomes necessary to define when doubling is to occur. In doing so, I make use of the fact that when the size of the file is known, it is possible to determine a doubling frontier x, which is in the range of exhash(ARG), at which doubling should occur. The value of x varies with the file size. The result is that, as the file grows, the value of x is contained in different data nodes. The node currently containing the value of x is the one to be doubled. If the file shrinks, this process can be reversed, leading to the halving of the indicated node.

To determine the value of x, a count must be kept of the number of entries (records) E contained in the file. This count can be kept along with the index for the file in the main memory buffer.

The following fixed quantities also help determine the value of x.

(1) I: the number of index terms, and hence the number of data nodes.
(2) M: the number of data entries (records) that can be contained on a data page. This is an average if the size of the records is variable.
(3) n: the size associated with the index entry for exhash(key)='11 . . . 1', i.e., the last entry of the index. This size indicates a data node of $2^n$ pages.
(4) u: the fill utilization if one ignores the presence of overflow pages. This is the desired utilization. The error introduced by ignoring overflow pages is very small for values of u up to 75–80%.

By simple algebra, then, it is possible to compute the value x which indicates which node to double. It is:

$$x = \frac{E}{I * 2^n * M * u} - 1 \tag{3}$$

The value of x will cross a node boundary after the insertion of:

$$\Delta E = 2^{n} * M * u \text{ entries,} \tag{4}$$

i.e., after the insertion of sufficient data to fill one additional data node. The value of $\Delta E$ doubles after the data node size of the last index entry increases from $2^n$ pages to $2^n + 1$ pages At this point, the value of x changes from '11 . . . 1' to '00 . . . 0', that is, it changes from referencing the last index entry to referencing the first index entry.

Thus, the signal for doubling a node is not given by the state of its O-tree but rather by a property of the file, i.e., the value of x.

DISK STORAGE MANAGEMENT

There are two reasons for having an index level for BEH files. One is to permit the nodes of the file to be mapped into non-contiguous storage, thus avoiding the storage utilization penalty associated with pre-allocating large blocks of the disk to the file prior to the space being needed to store data. The second reason is to permit multipage reading and writing to be used during node doubling (or node halving) or for sequential reading, thus improving the performance of these operations.

Because BEH-organized files grow by node doubling (and shrink by node halving), they are managed by a method derived from the storage management scheme called the "buddy" method which is described in D. Knuth, *The Art of Computer Programming*, Vol. 1, *Fundamental Algorithms*, Addison Wesley, (1977).

A "buddy" allocation method works with blocks of storage whose units are some integral power of two in size. Separate free lists are maintained for each different size block. If a block size is requested and there are no blocks of that size available, a larger block is split (and its pieces split again if necessary) in order to provide a block of the desired size. When blocks are freed, the "buddy" of the block must be examined to determine whether the freed block can be consolidated with it to create a larger block. Any consolidated block is likewise a candidate for further consolidation. It is this process that gives the method its name.

A buddy to a freed block is that block of the same size as the freed block whose address is determined as follows. If each disk address is l bits long, and the freed block has 2k units of storage (pages), then the buddy will share a common prefix with the freed block, the length of which will be $1-k-1$. The bit in the buddy following this common prefix will be the complement of the corresponding bit in the freed block. If consolidation occurs, the result is a free block of size $2^{k+1}$.

In the BEH file all nodes have numbers of pages that are integral powers of two. Hence, no space is wasted within the blocks. Further, the growth of the file (or its shrinkage) is such as to require a gradual change from one block size to another which is double (half) the size of the previous block. The activity of changing block size occurs at the frontier indicated by the value of x. Blocks in this region are readily consolidated during file growth, without the number of blocks on each free list of blocks of a given size ever becoming large. During file shrinkage, splitting of blocks preserves the short length of these lists.

When managing disk storage, unlike main memory, one wants to avoid going to the "buddy" itself to see whether it is free and can be consolidated with the just freed block. If this were done, it would require an extra disk access for each free operation. For this reason, all bookkeeping required by the method is fully separate from the storage being managed so that it can be kept in main memory. Because of the short free lists for each size of available block, finding a buddy is readily accomplished by simply searching the free list with the appropriate size blocks. If these lists are very short, a sequential search should be adequate. Should the lists be somewhat longer, a binary digital tree (trie) can be used to locate the buddy. In either case, the technique needed is straightforward. The detailed algorithms and data representations required are well known.

Having thus described my invention, what I claim as new, and desire to secure by Letters Patent is:

1. A method for establishing and maintaining a key-accessed file management organization and procedure in a computer system which includes a primary and secondary memory, said method comprising:
   providing a data level including a set of blocks of pages stored in the secondary memory;
   providing an index level stored in the primary memory when the file is in use;
   said index level including a set of index entries, each of which includes a starting address indicating the location on the secondary memory where a block of contiguous pages begins; and
   a size field indicating the number of pages in said block of pages having said starting address;
   said method further comprising maintaining the file by:
   changing the number of pages in said blocks as the size of the file changes,
   specifying said size in the size field as the logarithm, base two, of the number of pages referenced by said index entry, and
   changing the size field in any index entry in which the number of pages in the referenced block is changed.

2. A method for establishing and maintaining a key-accessed file management organization and procedure in a computer system which includes a primary and secondary memory, said method comprising:
   providing a data level including a set of blocks of pages stored in the secondary memory;
   providing an index level stored in the primary memory when the file is in use;
   said index level including a set of index entries, each of which includes a starting address indicating the location on the secondary memory where a block of contiguous pages begins; and
   a size field indicating the number of pages in said block of pages having said starting address;
   said method further comprising maintaining the file by:
   changing the number of pages in said blocks as the size of the file changes, and concurrently changing the number in the size field in the index level entry for each respective block to reflect the change in the number of pages.
   said entries in the index level being initially organized by the method of:
   generating a unique key which is a function of a file record to be accessed in memory, said keys comprising at least a portion of an address in said index level;
   distributing the keys uniformly over their address space by a first function h(key); and
   redistributing the keys exponentially over the same address space by second function.

3. A method for establishing and maintaining a key-accessed file management organization as in claim 2 wherein said generating step includes:
   choosing the first function, h(key), from a class of universal hashing functions; and
   choosing the second function to be $2^{h(key)} - 1$.

4. A method for establishing and maintaining a key-accessed file management organization and procedure in a computer system which includes a primary and secondary memory, said method comprising:
   providing a data level including a set of original blocks of pages stored in the secondary memory;
   providing an index level stored in the primary memory when the file is in use;
   said index level including a set of index entries, each of which includes a starting address indicating the location on the secondary memory where a block of contiguous pages begins; and
   a size field indicating the number of pages in said block of pages having said starting address;
   said method further comprising maintaining the file by:
   changing the number of pages in said blocks as the size of the file changes, and concurrently changing the number in the size field in the index level entry for each respective block to reflect the change in the number of pages, including increasing the amount of data storage space available on said secondary memory comprising the step of:
   allocating a second block of pages in said data level referenced by an index entry to effectively double the size of an original block of pages.

5. A method as in claim 4 further comprising the steps of:
   changing the value of the size field indicating the size of said block associated with said index entry to a value which is a function of the number of pages in said second block; and
   changing the starting address associated with said index entry to refer to the location in said secondary memory containing the first page in said second block of pages.

6. A method as in claim 4, including the step of decreasing the amount of data storage space available on said secondary memory comprising:

de-allocating pages of an original block of pages to form a second block of pages in said data level referenced by said index entry to effectively reduce the size of said original block of pages by one half.

7. A method as in claim 6 further comprising the steps of:

changing the value of the size field indicating the size of said block associated with said index entry to a value which is a function of the number of pages in said second block; and changing the starting address associated with said index entry to refer to the location in said secondary memory containing a first page in said second block of pages.

8. A three phase method for establishing, maintaining and searching a key-accessed file management organization in a computer system which includes a primary and secondary memory, said establishing phase comprising:

providing a data level including a set of blocks of pages stored in the secondary memory;

providing an index level stored in the primary memory when the file is in use;

said level including a set of index entries, each of which includes a starting address indicating the location on the secondary memory where a block of contiguous pages begin; and a size field indicating the number of pages in said block of pages having said starting address;

said maintaining phase comprising;

changing the number of pages in said blocks as the size of the file changes;

said searching phase for searching said file comprising the steps of:

finding the index entry associated with a selected key by utilizing said key as an address argument in said index level memory; and computing, based on an address and a size associated with said index entry, the address of the page, among the block of pages addressed, in which data associated with said key is found;

wherein each block of pages has $2^m$ pages, where m is an integer which may be different for different blocks, and wherein said step of computing comprises the steps of:

selecting n predetermined bits of said key, where n is the logarithm, base two, of the number of pages in the block referenced by said entry; and adding said n bits to the address associated with said index entry, thereby generating the address of the page in which data associated with the key is found.

9. A three phase method for establishing, maintaining and accessing a key-accessed file management organization and procedure in a computer system which includes a primary and secondary memory, said establishing phase comprising:

providing a data level including a set of blocks of pages stored in the secondary memory;

providing an index level stored in the primary memory when the file is in use;

said index level including a set of index entries, each of which includes a starting address indicating the location on the secondary memory where a block of contiguous pages begins; and a size field indicating the number of pages in said block of pages having said starting address;

said maintaining phase including;

changing the nuxler of pages in said blocks as the size of the file changes;

said accessing phase including accessing more data than can be contained in a single page comprising the steps of:

associating at least one overflow page with said block of pages; and placing the address of said at least one overflow page at a predetermined location in said pages.

10. A method as in claim 9 wherein:

each said overflow page is associated with a contiguous sub-block of pages, with each page of the block being in a unique sub-block.

11. A method as in claim 9 for accessing more data than can be contained in said at least one overflow page comprising the steps of:

(a) associating said overflow page with a contiguous sub-block of pages;

(b) associating another overflow page with a second contiguous sub-block of pages;

(c) with each page being in a unique sub-block;

(d) inserting into said overflow page the address of said other overflow page as part of an index entry which identifies the pages associated with overflow data contained in said other overflow page.

12. A method as in claim 11 for accessing more data than can be contained in said overflow pages comprising the steps of:

recursively applying steps (a), (b), (c) and (d) as overflow pages themselves overflow, thereby resulting in a tree of overflow pages.

* * * * *